United States Patent [19]

Barnum et al.

[11] Patent Number: 4,498,203
[45] Date of Patent: Feb. 12, 1985

[54] FLOOD PREVENTER FOR FLUID FILLING SYSTEMS

[75] Inventors: Thomas G. Barnum, Fox Point; Thomas E. Pelt, Greenfield, both of Wis.

[73] Assignee: Bradley Corporation, Menomonee Falls, Wis.

[21] Appl. No.: 608,392

[22] Filed: May 9, 1984

Related U.S. Application Data

[63] Continuation-in-part of Ser. No. 498,149, May 25, 1983, abandoned.

[51] Int. Cl.³ .................. E03D 11/02; E03D 11/18
[52] U.S. Cl. .......................................... 4/427; 4/415;
  4/661; 4/DIG. 15; 137/389; 137/392;
  137/624.27; 137/624.12
[58] Field of Search ............ 4/427, 661, 415, 205,
  4/DIG. 15, 302, 249, 301, 304-306, 308, 312,
  328, 407; 137/624.27, 389, 606, 392, 624.12;
  251/131, 134

[56] References Cited

U.S. PATENT DOCUMENTS

| Re. 29,715 | 8/1978 | Richards | 141/226 |
|---|---|---|---|
| 2,656,145 | 10/1953 | Lawson | 251/134 |
| 2,778,209 | 1/1957 | Young | 4/427 |
| 2,988,751 | 6/1961 | Rutherford | 4/427 |
| 3,262,132 | 7/1966 | Mann | 4/427 |
| 3,280,808 | 10/1966 | Mosher et al. | 123/119 |
| 3,703,907 | 11/1972 | Richards | 137/81.5 |
| 3,750,634 | 8/1973 | Nakajima et al. | 123/119 |
| 3,908,204 | 9/1975 | Hopkins | 4/406 |
| 3,928,874 | 12/1975 | Albertson | 4/406 |
| 3,943,974 | 3/1976 | Connelly et al. | 137/624.27 |
| 3,987,502 | 10/1976 | Hartmann | 4/420 |
| 4,041,557 | 8/1977 | Ringler | 4/427 |
| 4,148,334 | 4/1979 | Richards | 137/389 |
| 4,195,374 | 4/1980 | Morris et al. | 4/427 |
| 4,203,173 | 5/1980 | Morris et al. | 4/427 |
| 4,204,285 | 5/1980 | Pak | 4/427 |
| 4,402,093 | 9/1983 | Luker et al. | 4/427 |

OTHER PUBLICATIONS

Stefanides, E. J., "Fluid Handled Powers Automatic Filter Valve," Design News, Feb. 21, 1983, pp. 110–111.

Primary Examiner—Henry K. Artis
Attorney, Agent, or Firm—Quarles & Brady

[57] ABSTRACT

A flood preventer has a pneumatically operable lockout mechanism to disable a valve actuator and prevent its repeated operation when fluid in a receptacle has reached an excess level. In the preferred embodiments the flood preventer has a latch that is responsive to a partial vacuum to engage a catch in the linkage between the valve actuator and a fill control valve. The partial vacuum is created by the flow of fluid into the receptacle through a venturi. The venturi is connected by a vacuum line to a fluid level sensing orifice that opens into the receptacle and relieves the partial vacuum when not blocked by fluid that has reached an excess level. In two other embodiments the partial vacuum is subject to the same conditions at the venturi and the orifice, but the lockout mechanisms are different. In the second embodiment a pin is dropped out to uncouple a valve actuator linkage, while in a third embodiment a jamming mechanism is used to block movement of the valve actuator.

18 Claims, 8 Drawing Figures

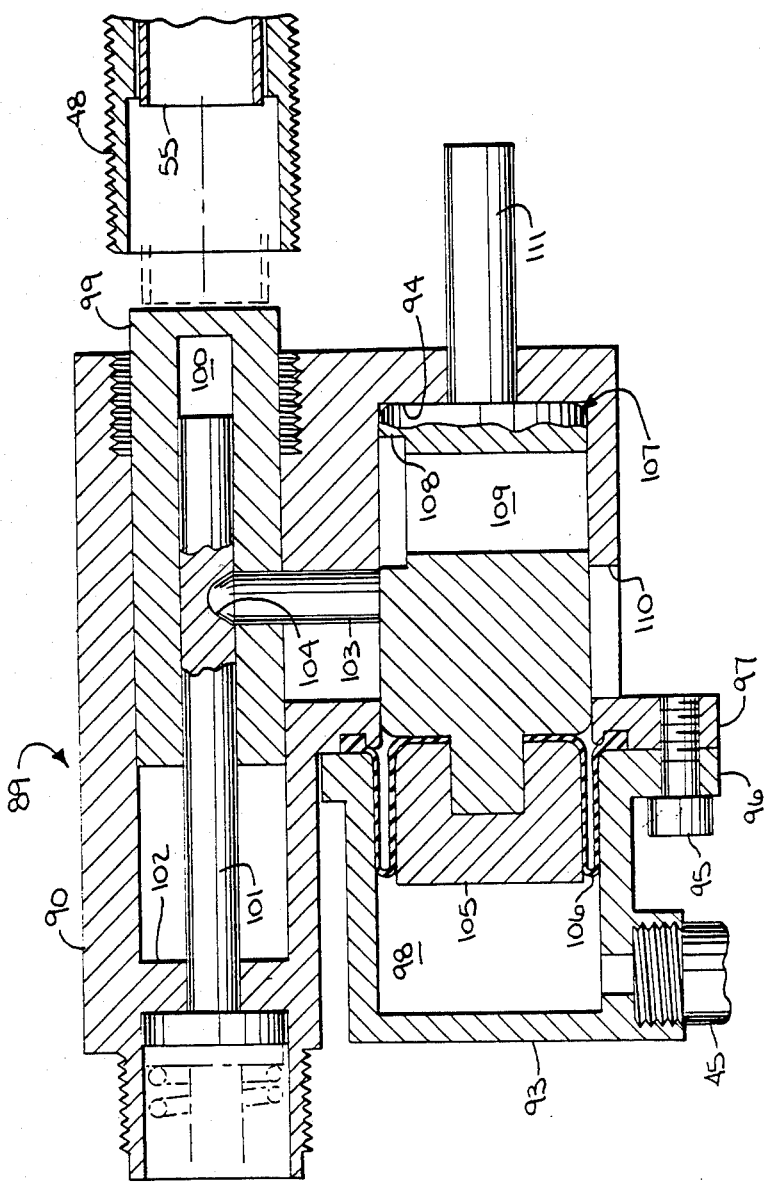
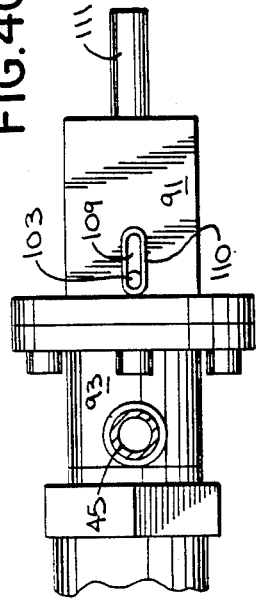
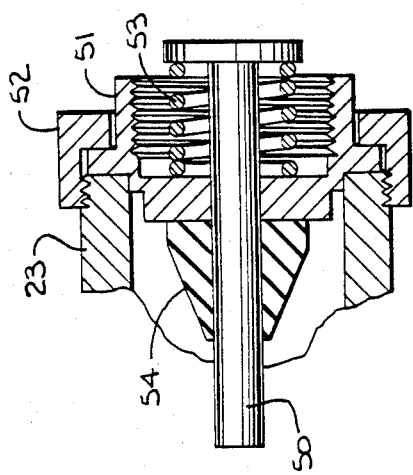
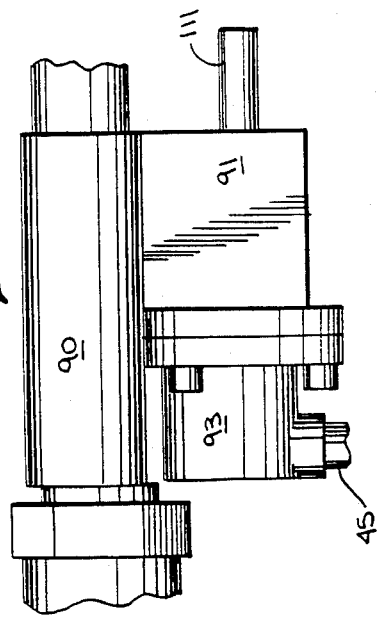
FIG. 4B
FIG. 4C
FIG. 4A

FLOOD PREVENTER FOR FLUID FILLING SYSTEMS

CROSS-REFERENCE TO RELATED APPLICATION

This is a continuation-in-part of a copending U.S. patent application Ser. No. 498,149 filed May 25, 1983 and now abandoned.

BACKGROUND OF THE INVENTION

I. Field of the Invention

The invention generally relates to mechanisms for preventing flooding or overflows in holding tanks and receptacles. The invention more particularly relates to preventing overflows in toilets of the type used in prisons or other institutions, however, the invention is capable of significantly wider application.

II. Description of the Prior Art

In recent years, greater attention has been paid to the expansion and renovation of prisons and other correctional facilities. It has been the experience in such facilities that inmates will sometimes attempt to disrupt normal operations by stuffing clothes or other objects into a toilet bowl and by repeatedly flushing the toilet to cause its flooding. This can result in substantial property damage, and if the living units in which the toilets are located are on an upper floor, the overflow may find its way to offices, archives or other areas below. Toilets in such facilities must be tamper-resistant in order to prevent these occurrences.

Various devices have been proposed to prevent either accidental or deliberate flooding of toilets. For example, in Ringler, U.S. Pat. No. 4,041,557, an electrode is positioned in a fill line leading to a toilet bowl. The fill line is located at an elevation corresponding to the desired water level so that if the water exceeds this level, the excess water level will be sensed. The electrode will generate a signal to open a pair of normally closed contacts, which are connected as part of an electrical circuit between the flush actuator and an electrically operated flush control valve. This type of electrical system is relatively expensive as a result of the safety restrictions that arise when electrical elements are used around water and conductive materials in the vicinity of a human body.

Albertson, U.S. Pat. No. 3,928,874 shows another type of overflow inhibitor mechanism in which a flood-operated switch element is located inside a toilet bowl to provide an electrical signal to a solenoid-actuated valve. This valve can be positioned in either a water supply line or in a line connecting a holding tank to the toilet bowl. A third alternative is disclosed in which a water pressure sensing switch is used to operate a solenoid for jamming the flush handle. Each of these three mechanisms would be easily defeatable in the institutional environment described above, because they assume that the toilet has an exposed reservoir tank that would render the flush mechanism accessible to the user. The disadvantage related to the and cost of electrically actuated control systems is also applicable to the Albertson devices.

While provision of a mechanically actuated flood preventer overcomes some of the disadvantages of the electrical systems, there are other technical problems posed by their mechanical actuators. For example, there is a certain amount of variation or tolerance in the dimensions of mechanical parts that must be accounted for. Otherwise, a mechanical disabling device might only partially disable a flush control valve, so that the valve could be actuated a second time if its manipulation was studied long enough.

There is also a need to provide a mechanical disabling mechanism that can be adapted to and used with flush control valves and actuators that are now commercially available. It would be a disadvantage if the use of a flood prevention mechanism required substantial modification of commercially available flush valves, or the design of custom flush valves.

SUMMARY OF THE INVENTION

The invention resides in a pneumatically responsive flood preventer mechanism for insertion between a valve that controls the filling of a receptacle and a valve actuator to prevent repeated actuation of the valve that would cause overfilling and flooding of the receptacle.

The invention more particularly includes a vacuum generator in the supply line with the valve, the vacuum generator having a low pressure port for drawing a partial vacuum as fluid passes through the vacuum generator into the receptacle.

The flood preventer mechanism also includes a level sensor with an orifice that opens into the receptacle at a level above the normal fluid level. The orifice allows relief of any partial vacuum communicated to the level sensor when the fluid in the receptacle is below the orifice. The orifice becomes partially sealed when fluid in the receptacle rises to cover the orifice. Because the fluid has a greater viscosity than air, the vacuum can no longer be relieved.

The vacuum generator and the level sensor are both connected to a lockout mechanism that is responsive to a partial vacuum. Flow through the vacuum generator provides a source of partial vacuum and unless it is "short-circuited" or relieved through the unblocked orifice, the partial vacuum will operate the lockout mechanism, which is positioned between the valve and the actuator to prevent their cooperation.

The invention can be applied to many types of fluid filling systems, and for the application disclosed herein, several embodiments are disclosed. The preferred mechanisms use a latching device to maintain a positive and immobilizing hold on a portion of the flush actuator linkage as it is depressed. In another embodiment, a release mechanism is provided, which is similar to the first embodiment in allowing disengagement of the flush control valve, but which does not maintain a positive hold on the flush actuator linkage. In yet another embodiment, a jamming mechanism is provided. This mechanism is less advantageous than the others, as excessive forces might be transmitted to the lockout mechanism through the actuator, but the jamming mechanism would still have utility in certain applications.

The general object of the invention is to provide a mechanical flood prevention mechanism for fluid filling systems.

A more particular object of the invention is to provide a vacuum-responsive flood prevention device in which a source of vacuum is provided by the filling operation.

Another object of the invention is to provide an alternative to electrically actuated flush control systems, which are not viewed as cost effective.

Another specific object of the invention is to provide a mechanism that can be added to an off-the-shelf, mechanically actuated fill/flush control valve.

Another specific object of the invention is to provide a reset mechanism for the flood prevention device.

Another specific object of the invention is to minimize the length of the device that is interposed between the flush actuator and the flush control valve. This is important because the space designed for the plumbing associated with toilets tends to be minimized.

Another specific object of the invention is to provide alternatives to jamming devices.

These and other objects and advantages of the invention will appear from the following description. In the description, reference is made to the accompanying drawings which form a part hereof and in which there is shown by way of illustration, a preferred embodiment and three alternative embodiments. Such embodiments do not necessarily represent the full scope of the invention, however, and reference is made to the claims for determining that scope.

BRIEF DESCRIPTION OF THE DRAWINGS

FIG. 4A is a side view in elevation of an alternative embodiment of the lockout device of the invention;

FIG. 4B is an enlarged, partly exploded, sectional view of the invention seen in FIG. 4A;

FIG. 4C is a detail bottom view of the lockout device seen in FIGS. 4A and 4B;

DESCRIPTION OF THE PREFERRED AND ALTERNATIVE EMBODIMENTS

Figure 1:
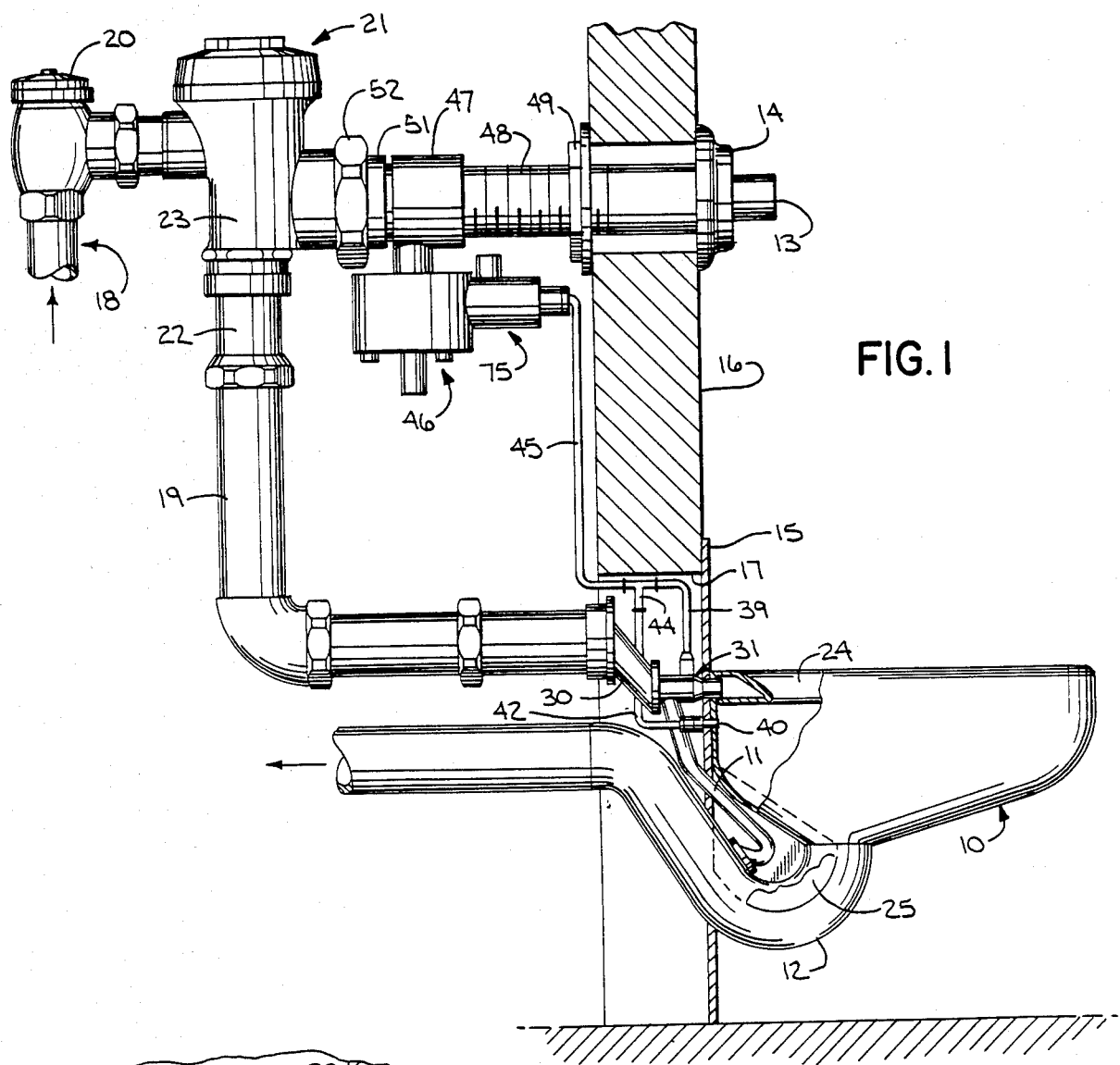
FIG. 1 is a side view in elevation of a plumbing system that incorporates a preferred embodiment of the flood prevention mechanism of the present invention.

Referring to FIG. 1, the invention is shown as it relates to a toilet and plumbing of the type used in correctional facilities. The only portions of the installation that extend into a living unit of the facility are the toilet bowl 10, a blowout pipe 11, a drain pipe 12, a flush actuator button 13, and an escutcheon plate 14. The toilet bowl 10 and pipes 11 and 12 are made of stainless steel for durability. The blowout pipe 12 and the area between the bottom of the bowl 10 and the drain pipe 11 are enclosed on opposite sides by stainless steel cover plates 25, one of which is seen broken away in FIG. 1. The toilet bowl 10 is mounted to a stainless steel back plate 15, which in turn is fastened to a wall 16 of the facility by nuts (not shown), which are welded on the back of the plate 15 to receive bolts (not shown). The back plate 15 secures both the toilet plumbing and a wall opening 17 from access by persons in the living unit and this limitation is desirable in correctional facilities.

The toilet bowl 10 is filled from a water supply line 18 represented by a water inlet pipe at the upper left of FIG. 1. During the flush cycle, water is admitted to a fill line portion 19 of the water supply line 18 through an isolation valve 20 and a flush/fill control valve 21. The flush/fill control valve 21 is of the type which opens for a predetermined time interval upon manual actuation and then closes automatically. This type of valve 21 must be allowed to reset before being actuated a second time to initiate a second flush cycle. The flush/fill control valve 21 and its timed interval of valve opening are matched with the system water pressure to provide a sufficient volume of water for forcing the contents of the toilet bowl 10 through the drain pipe 12. This volume of water typically flows into the toilet bowl at a location or locations around the rim 24 (FIG. 2) and also flows into the drain pipe 12 through the blowout pipe 11. When the flush/fill valve 21 closes, the remaining water fills the bottom portion of the toilet bowl 10 to form a water trap seal.

The flush/fill control valve 21 is a commercially available, off-the-shelf item. It is supplied with an associated actuator assembly and is available under the trade designation Royal 601 Valve from the Sloan Valve Company of Franklin Park, Ill. A vacuum breaker 22, also available from the Sloan Valve Company under the trade designation V-500-A, is connected to the lower end of the valve housing 23. Extending downwardly from the vacuum breaker 22 is a vertical section of the fill line piping 19. The upper end of this section is connected with the aid of a union, while the lower end of the section is connected with an elbow and two more unions to two horizontal sections of the fill line piping 19. These horizontal sections lead to the wall opening 17, where a downwardly slanting connecting section 30 leads to a Y-fitting 31.

Figure 2:
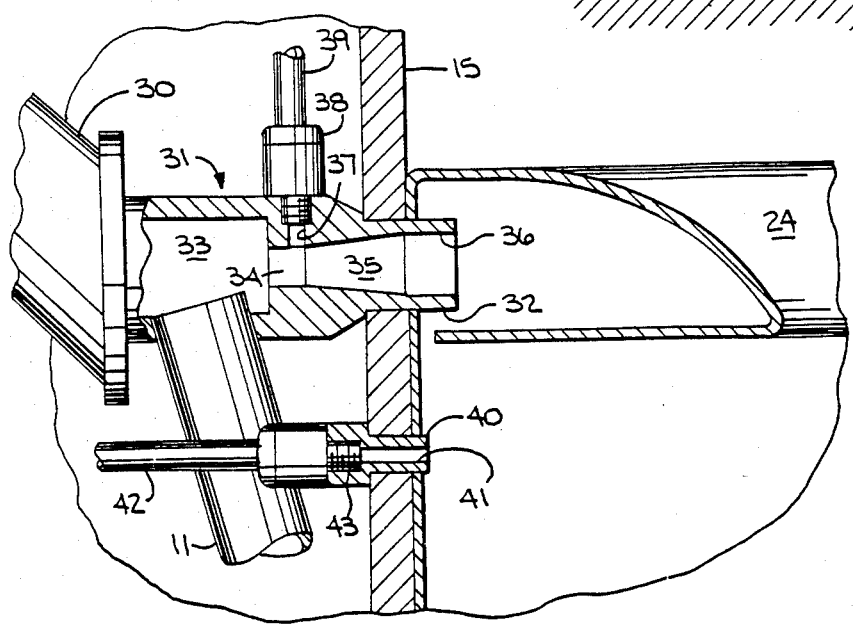
FIG. 2 is a detail view showing a portion of the toilet bowl and the elements of FIG. 1 that open into the bowl.

Referring now to FIG. 2, the Y-fitting 31 is made of stainless steel and is supported at one end by the connecting pipe 30 and at the other end by the back plate 15. The horizontal portion of the Y-fitting 31 forms a venturi nozzle 32 with a cylindrical inlet chamber 33 that leads to a constricted passage 34 and then through a widening transition passage 35 to an outlet 36 that opens into the toilet bowl 10. A low pressure port 37 is formed in the nozzle 32 to communicate with the constricted passage 34. A fitting 38 connects a first vacuum line 39 to the low pressure port 37. A portion of the water entering the Y-fitting 31 by-passes the constricted passage 34 and low pressure port 37 through the blowout pipe 11, which enters the inlet chamber 33 from the bottom. The remaining portion of the water, however, is conveyed through the constricted passage 34, the transition passage 35 and the outlet 36. This flow creates a pressure drop in the constricted passage 34 which draws a partial vacuum through the vacuum line 39.

The venturi nozzle 32 is a preferred type of vacuum generating source. It is, however, well known that other flow devices known as ejectors or eductors also perform a vacuum generating function, and these could be used to carry out the invention in other embodiments.

Also seen in FIG. 2 is a stainless steel level sensor 40, which is mounted in the back plate 15 and which has an orifice 41 that opens into the toilet bowl 10 a short distance below the rim 24. The level sensor 40 is connected to a second vacuum line 42 by a fitting 43. Referring back to FIG. 1, it will be seen that the vacuum line 42 is connected to the vacuum line 39 by a three-way T-shaped connector 44. This connector 44 also connects both vacuum line 39 and vacuum line 42 to a third vacuum line 45 which travels upwardly to connect to a pneumatically responsive lockout device 46.

When water flows through the venturi nozzle 32, a partial vacuum is generated in vacuum line 39. This partial vacuum will also be drawn through line 45 to operate the lockout device 46 unless the partial vacuum is relieved or satisfied through vacuum line 42.

The invention utilizes the fact that water has a higher density and a higher viscosity (resistance to flow) than air. The orifice 41 is large enough so that enough air can be drawn through line 42 to satisfy any partial vacuum in line 39 that would otherwise be drawn through line 45. The orifice 41 is too small, however, to allow enough of the higher viscosity medium, water, to be drawn through lines 42 and 39 so as to relieve the vacuum generated by flow through the venturi nozzle 32.

When water stands in the toilet bowl 10 between flushing cycles to form a water trap seal it reaches a level that shall be referred as the normal level. Any level above this normal level shall be referred to as an excess level. The level sensor 40 is usually located at some preselected excess level which is greater than the lowest excess level so that the lockout mechanism 46 will not be operated unless overflow of the rim 24 is threatened.

As long as the water in the toilet bowl 10 remains below the level sensor 40, air will be drawn through the orifice 41 and the vacuum line 42 to relieve any partial vacuum caused in line 39 by flow through the venturi nozzle 32. On the other hand, when water reaches the level of the sensor 40 and covers the orifice 41, water is drawn into the orifice 41. However, the higher viscosity of the water prevents enough flow in line 42 to satisfy the partial vacuum drawn in line 39, and a partial vacuum is thus also drawn through line 45.

In this particular embodiment the level sensor 40 is in the form of a fitting attached to vacuum line 42. It should be understood however, that in other applications where security is a lesser consideration, line 42 could itself serve as the level sensor and could be installed to extend over the rim and then downward into the tank being protected from overflows.

Now that the vacuum generating source and the level sensor have been described, the pneumatically responsive element of the invention will be described in greater detail. The pneumatically responsive element is the lockout device 46.

As seen in FIG. 1, the lockout device 46 has a brass housing assembly that includes a tubular sleeve extender 47. This sleeve extender 47 receives a threaded outer sleeve 48 of the commercially available actuator assembly, which is fastened to the wall 16 by a flanged retaining nut 49. The sleeve extender 47 also has a portion of slightly reduced diameter that is coupled to a portion of the flush/fill control valve housing 23 by an adapter 51. The remaining portions of the lockout device housing extend radially from the horizontal axis along which the valve 21 is actuated.

Figure 3:
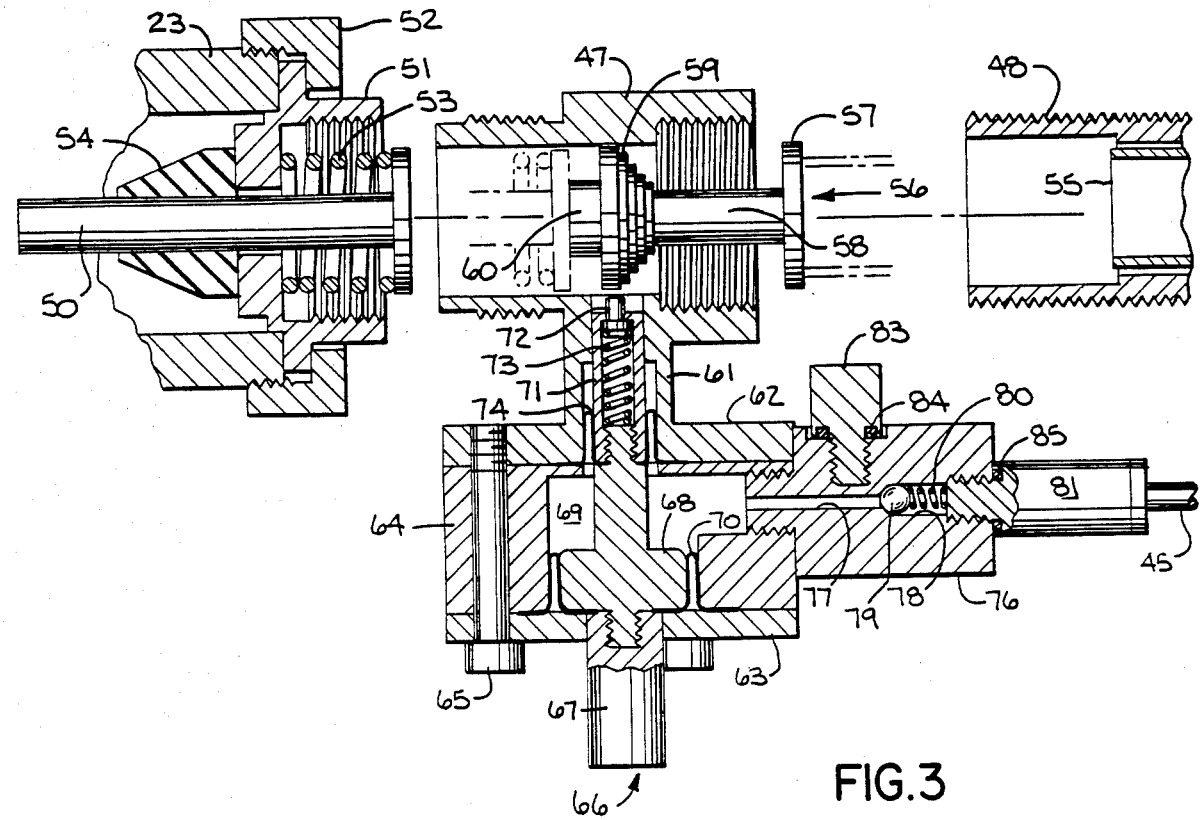
FIG. 3 is an enlarged, partially exploded, sectional view of the embodiment of FIG. 1.

The details of the lockout device 46 and its interconnection to the flush/fill control valve 21 and the flush valve actuator assembly can be seen best in FIG. 3. In the upper left part of FIG. 3, in a portion of the valve housing 23 is a flanged valve actuator rod 50, an acuator coupling adapter 51, a flanged coupling nut 52, a return spring 53, and a frusto-conical, resilient seal 54. The valve actuator rod 50 extends through an opening at the center of the actuator coupling adapter 51. The return spring 53 encircles the actuator rod 50 and is captured between the closed end of the adapter 51 and the flange on the valve actuator rod 50. The frusto-conical seal 54 encircles the valve actuator rod 50 and abuts the interior side of the adapter coupling 51 to seal the area where the actuator rod 50 enters the valve housing 23. The adapter 51 is held in place by the flanged coupling nut 52 which is slipped over the outer diameter of the adapter 51 and the extending portion of the valve housing 23. The adapter 51 has a threaded bore that receives and engages an exterior thread formed around the reduced portion of the sleeve extender 47.

Portions of the commercially available actuator assembly associated with the flush/fill control valve 21 are shown on the far right in FIG. 3. An inner actuator sleeve 55 is connected to the flush actuator button 13 (FIG. 1) and is moved reciprocally within the outer actuator sleeve 48. In the absence of the lockout device 46 and sleeve extender 47, the end of the actuator sleeve 48 would be received in the bore of the valve coupling adapter 51. In that instance, the inner sleeve 55 would engage the flanged end of the valve actuator rod 50, to control operation of the flush/fill control valve 21.

Besides the sleeve extender 47, the invention provides a second valve actuator rod 56 of stainless steel that is interposed between the inner actuator sleeve 55 and the flanged actuator rod 50. This second actuator rod 56 also has an end flange 57 for engagement by the inner actuator sleeve 55. From the end flange 57, a cylindrical shaft 58 extends to a ratcheted section 59, which is formed by a series of rings that increase in diameter as they recede in the direction of the valve actuator rod 50 to provide a stepped configuration as seen in FIG. 3. Extending from the largest ring is a cylindrical post 60 that engages the end flange of the first valve actuator rod 50. The length of the sleeve extender 47 is such that when the lockout device 46 is installed, the second valve actuator rod 56 is held against the actuator sleeve 55 by the force of the valve return spring 53, which is slightly compressed. A train of engaged members is then available to transmit motion of the actuator button 13 (FIG. 1) to operate the flush control valve 21 (FIG. 1).

Still referring to FIG. 3, the brass housing assembly for the lockout device 46 extends radially from the sleeve extender 47 via a hollow neck 61. At the distal end of this neck 61 is a circular flange 62 extending radially from the neck. Sandwiched between this flange 62 and an annular cover member 63 is a doughnut member 64. Housing bolts 65 extend upwardly through the cover member 63 and vertically through the sidewalls of the doughnut member 64 into threaded holes in the flange 62. Three such bolts 64 are angularly spaced 120° apart with reference to an axis through the length of the neck 61.

A plunger assembly 66 extends radially inward relative to the sleeve extender 47 through the hollow interior of the neck 61. This plunger assembly 66 includes a cylindrical reset shaft 67 of Celcon plastic extending through the housing cover member 63 and engaging a threaded stem on a brass piston element 68. The doughnut member 64 of the housing assembly forms a cylindrical vacuum chamber 69 around the piston element 68. A first rolling diaphragm 70 of synthetic elastomeric material has an outer edge trapped between the cover member 63 and the doughnut member 64. The diaphragm 70 extends inwardly towards the piston 68 and has a long fold positioned in an annular space that is formed around the widest part of the piston 68. The central portion of the diaphragm 70 is attached to the underside of the piston 68 and moves with it. The diaphragm 70 is effective to seal the vacuum chamber 69 from leakage at the point where the reset shaft 67 penetrates the housing cover 63.

Continuing with the description of the plunger assembly 66, the piston element 68 necks down as it extends upwardly through the vacuum chamber 69 to a threaded stem that engages a latch tube 71 of stainless steel. At the top end of the latch tube 71 there is a small opening through which a latch button 72 extends. This button 72 is made of stainless steel and has a flange to retain the button 72 within a bore in the latch tube 71. A latch button loading spring 73 is captured in the bore and engages the button flange. It can be seen in FIG. 3 that the spring 73 is loaded when the plunger assembly 66 is moved radially inward towards the second valve actuator rod 56 and when the button 72 is blocked by the largest ring or step in the ratcheted section 59.

A second, cylindrical rolling diaphragm 74 of synthetic elastomeric material has an outer lip trapped between the face of the doughnut member 64 and the flange 62. This diaphragm 74 has a long fold in an annular space within the neck 61 that surrounds the latch tube 71. The second diaphragm 74 seals the vacuum chamber 69 against leakage through the neck 61 of the housing assembly.

The plunger assembly 66 is operated when a partial vacuum is present in the vacuum chamber 69 to exert a force on the working surface of the piston 68 and its associated diaphragm 70. Thus, a partial vacuum will draw the plunger assembly along its longitudinal axis and further into the housing assembly. If the flush/fill control valve 21 is in its reset position as shown in phantom in FIG. 3, the end flange of the first valve actuator rod 50 will be engaged by the post 60 of the second valve actuator rod 56. At the other end of the second valve actuator rod 56, the inner actuator sleeve 55 is in engagement with its end flange. When the plunger assembly moves towards the second valve actuator rod 56, the latch button 72 will be blocked by the largest ring of the ratcheted section 59, which will result in loading of the latch button spring 72.

When the flush actuator button 13 (FIG. 1) is depressed, the ratcheted section 59 of the second actuator rod 56 moves to the left so that the spring-loaded latch button 72 will move inwardly to engage one of the steps of the ratcheted section 59, depending on the amount of travel of the actuator train of parts. The stepped or ratcheted section 59 provides a built-in adjustment for variations or tolerances in the manufacture of components. If the amount of travel required to actuate the flush/fill control valve 21 is very short as a result of these variations, the latch button 72 will still be able to engage and block the return movement of the largest ring of the ratcheted section 59. On the other hand, if the length of travel is longer, the latch button 72 will be able to engage one of the smaller rings of the ratcheted section to positively hold the valve control rods 50 and 56, and assure that the the flush/fill control valve 21 cannot reset. If the flush actuator button 13 is manipulated in and out a shorter distance than its full length of travel, each succeeding manipulation will result in the further engagement of the ratcheted section 59 an a succeeding step or ring. Thus, each succeeding manipulation of the actuator button 13 will result in a reduction in any further manipulation.

The plunger assembly 66 is moved radially inward in response to a partial vacuum drawn through vacuum line 45 in FIG. 1 as a result of flow through the venturi 32 and blockage of the orifice 41. After a partial vacuum has been drawn in response to conditions in the bowl 10, it is intended that the plunger assembly 66 be operated, and not be defeated by subsequent conditions. Therefore, a check valve 75 (FIG. 1) is attached to one side of the housing assembly and connected to vacuum line 45. As seen in detail in FIG. 3, the check valve has a brass valve body 76 with a threaded stem that is received in a threaded port in the sidewall of doughnut member 64. Check valve body 76 has a passageway 77 that extends from the vacuum chamber 69 to a wider valve chamber 78. A synthetic rubber ball 79 is seated by a biasing spring 80 at the end of the valve chamber 78 that communicates with the passageway 77. At the other end of the valve chamber 78, a quick-disconnect fitting 81, such as one of the type offered by Legris, Inc., Rochester, N.Y., is threadingly inserted into the valve body 76 to connect vacuum line 45. An O-ring seal 85 is used between the fitting 81 and the valve body 76.

When a partial vacuum is drawn through the line 45, a pressure differential will be developed on the check valve ball 79 and it will be drawn against the biasing spring 80 to allow a partial vacuum to be developed in the vacuum chamber 69. If the partial vacuum in the line 45 is lost, the check valve ball 79 will return to its seated position and assure that the partial vacuum is not lost in the vacuum chamber 69.

To reset the lockout device 46, the check valve body 76 is provide with a threaded opening to receive the knob 83 of a relief valve. An O-ring seal 84 encircles the threaded stem to provide an airtight seal when the knob 83 is securely tightened to close the relief valve. To reset the lockout device the knob 83 is unscrewed to allow air to enter through passageway 76 into chamber 69 to relieve the vacuum. The plunger assembly 66 may then be pulled outwardly by its reset shaft 67, so that latch button 72 disengages ratcheted section 59. The energy stored in return spring 53 will then move both actuator rods 50 and 56 back to their initial positions, to re-engage the actuator sleeve 55.

Referring again to FIG. 1 it will be seen that the lockout device 46 is completely shielded by the wall 16 from occupants of the living unit. This will assure that the lockout device 46 will not be tampered with, and that once the lockout device 46 has been operated, only authorized persons will have the ability to reset the flush/fill control mechanism.

Referring to FIGS. 4A–4C there is illustrated an alternative embodiment of the lockout device of the invention. These figures relate to FIGS. 1 and 2 in a manner analogous to FIG. 3. FIG. 4A shows the exterior of a second lockout device 89 and FIG. 4B shows the device 90 as it is inserted between the flush actuator parts and the flush control valve parts that have been described relative to FIG. 3.

As seen in FIGS. 4A and 4B, a brass housing assembly for the lockout device 89 extends a greater distance horizontally and requires greater separation of the parts of the flush actuator and flush valve than does the housing in the preferred embodiment. The upper portion of this housing is formed as a barrel 90. Depending from the right bottom portion of the barrel 90 is a housing block 91 enclosing a cylindrical bore 94 extending parallel to the barrel 90. A smaller vacuum chamber member 93 is attached by bolts 95 which are received through a circular flange 96 on the vacuum chamber member 93 and through a circular flange 97 on one end of housing block 91 that abuts flange 96. The vacuum chamber 98 itself is an extension of the cylindrical chamber 94 in the housing block 91.

As seen best in FIG. 4B, interposed between sleeve 55 and valve actuator rod 50 is a closed end sleeve 99 of brass with a bore 100 opening towards the flush control valve to slidably receive the shaft of a second valve actuator rod 101 of stainless steel. The second valve actuator rod 101 has a flange that abuts the flange on the first valve actuator rod 50 and a shaft portion that extends through a retaining wall 102 towards one end of the barrel 91. The sleeve 99 and rod 101 are coupled by a stainless steel pin 103, which extends upwardly through a passage into the barrel 90, and through a sidewall of the sleeve 99 into a recess 104, which projects inwardly from the outer surface of the second actuator rod 101. In this coupled position it can be seen that there is a portion of the bore 100 that is not occupied by the second actuator rod 101. This unoccupied portion permits movement of the sleeve 99 relative to the rod 101 when the pin 103 is withdrawn from its linking position. Once the rod 101 reaches its full depth of insertion in the bore 100, the sleeve is allowed to float and become disengaged from the end of the inner actuator sleeve 55. In this embodiment, the first flush actuator rod 50 is not held in its depressed position when the device is in its lockout mode but is allowed to return to its initial position seen in phantom in FIG. 4B. "Lockout" as applied to this embodiment refers generally to disabling rather than a physical retention of a valve actuator rod.

This lockout mechanism 89 is operated in response to a vacuum drawn through the vacuum line 45, which is connected as seen in FIG. 4B. This causes a partial vacuum within the vacuum chamber 98 that operates on a cylindrical piston 105 of Celcon plastic and an associated diaphragm 106 of synthetic elastomeric material. The piston 105 is mounted on a stem of a cylindrical plunger 107, also made of Celcon plastic, which is slidably positioned in the bore of housing block 91. The rolling diaphragm 106 has an O-ring portion anchored between the cylindrical flanges 96 and 97 and a flexible or rolling portion disposed in a cylindrical gap between the piston 105 and the walls defining the vacuum chamber 98. The piston 105 slides back and forth with the plunger 107 across the back end of the coupling pin 103. An oval groove 108, seen also in FIG. 4C, is formed in one side of the plunger 107 to receive the back end of the pin 103 and allow it to drop out of its coupling position when the plunger 107 is moved in response to a partial vacuum pressure exerted on the piston 105.

To provide a reset operation the plunger 107 has a slot 109 extending from the groove 108 to its other side, and this slot 109 becomes aligned with an oval aperture 110 (as seen in FIG. 4C) in the housing block 92 when the plunger 107 moves on its forward stroke. This slot 109 is provided to allow an external implement to be inserted through the aperture 110 and against the back end of the pin 103 to urge it back into its coupling position. This assumes that the recess 104 in the second actuator rod 101 has been aligned with the aperture in the sidewall of the coupling sleeve 99. The plunger 107 is then further withdrawn by pulling its reset shaft 111 to the right until it reaches its original position seen in FIG. 4B.

Figure 5:
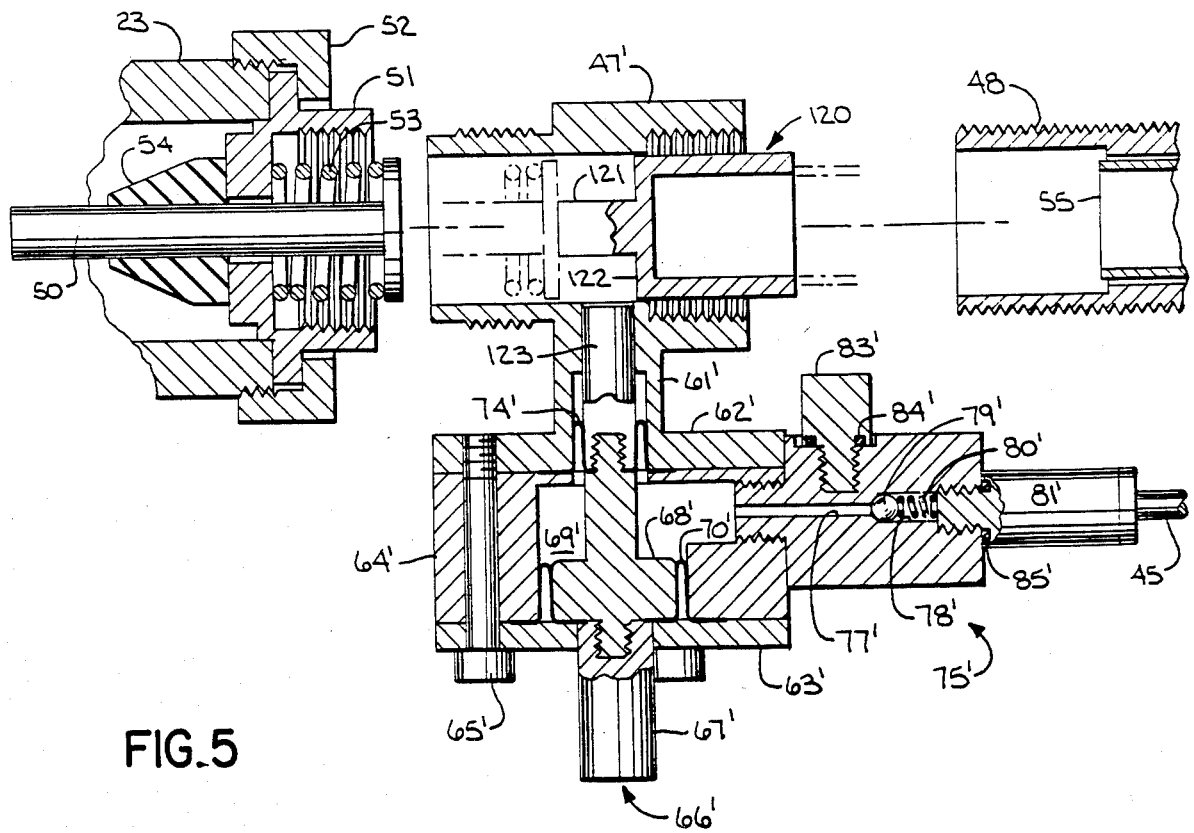
FIG. 5 is a longitudinal section view of a second alternative embodiment of the lockout device of the invention.

Referring to FIG. 5, another alternative embodiment of the lockout device is illustrated in the same environment as the devices in FIGS. 3 and 4A-4C. The insertion of the sleeve extender 47' provides a gap between the inner actuator sleeve 55 and the valve actuator rod 50 in which a jamming member 120 is positioned. The jamming member 120 is a cylindrical brass member with a bore opening in the direction of the inner actuator sleeve 55, with the other end of the bore being closed, and with a cylindrical stub 121 formed on the closed end and extending in the opposite direction to engage the rod 50. The stub 121 is of reduced diameter from the hollow portion of the jamming member 120 to provide a shoulder 122, which is blocked when a cylindrical blocking member 123 is urged into a position in the path of actuator travel. The stainless steel blocking member 123 is part of a plunger assembly 66' that also includes a brass piston member 68'. A reset shaft member 67' of Celcon plastic is threadingly connected to the piston member 68' and extends outwardly through a cover member 63'. The construction of the vacuum responsive portion of the lockout device is similar to FIG. 3 with respect to the inclusion of diaphragms 70' and 74' and the shape of the the vacuum chamber 69'. The check valve and relief valve assembly 75' is also the same as has been described relative to the first embodiment in FIG. 3.

The operation of the plunger assembly 66' is similar to that of the plunger assembly 66 in FIG. 3. When a vacuum is drawn into the vacuum chamber 69' the pressure differential on the piston 68' and diaphragm 70' draws the plunger assembly 66' inwardly into the housing assembly and positions the blocking member 123 in the path of travel of the jamming member 120. This blocks movement of the actuator sleeve 55 and flush actuator button 13 as seen in FIG. 1. When the vacuum is relieved, as described for the relief valve in the embodiment in FIG. 3, the blocking member 123 can be withdrawn by pulling outwardly on the projecting shaft 67'.

Figure 6:
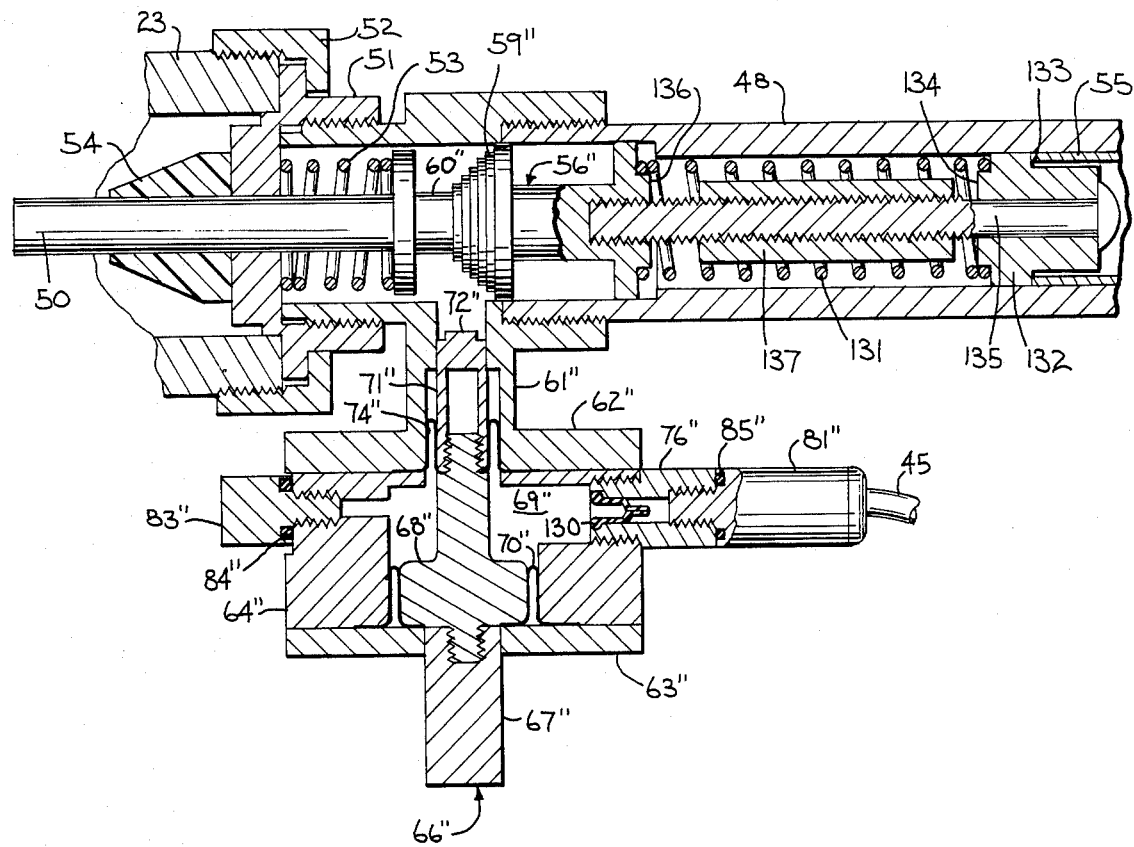
FIG. 6 is a longitudinal section view of a second preferred embodiment of the lockout device of the invention.

Referring to FIG. 6, a second preferred embodiment of the lockout device of the invention is illustrated in the same environment as the embodiment in FIG. 3. The same parts are used to couple the lockout device to the valve housing 23 on the flush/fill control valve 21 (seen in FIG. 1) and the same sleeves 48 and 55 are used to transmit motion from the actuator button 13. The parts in FIG. 6 which correspond to parts described in FIG. 3, but which may differ in minor respects, are identified by corresponding numbers with double prime notation.

The vacuum-actuated plunger assembly 66" is basically the same as in FIG. 3 and includes a reset shaft 67" coupled to a piston 68" which is coupled to a latch tube 71". A diaphragm 70" seals an annular gap between the piston 68" and a housing doughnut member 64". The housing also has a cover member 63" at the bottom, and a neck 61" and circular flange 62" at the top and bolts (not shown) holding the parts of the housing together. The doughnut member 64" forms a vacuum chamber 69" which is sealed from the neck 61" by a second diaphragm 74".

A quick disconnect fitting 81" and an O-ring 85" are threaded into a check valve body 76" similar to the other embodiments. There are some minor differences, however, in the relief valve and in the check valve for controlling the vacuum within the chamber 66", but these are not essential to the invention. For example, the relief valve knob 83" and O-ring seal 84" are mounted in the doughnut member 64" opposite a port in which a check valve housing 76" is threadingly inserted. And, a resilient check valve diaphragm 130 has replaced the check valve ball 79 and spring 78 of FIG. 3.

The primary differences in this embodiment are seen in the latching mechanism. A button 72" is integrated with the upper end of the latch tube 71" in FIG. 6. When a partial vacuum is generated in the vacuum chamber 69" and the plunger assembly 66" is drawn upward, this button will engage one of the steps on a racheted section 59" of an actuator rod 56". The actuator rod 56" includes a cylindrical post 60" which engages a flange on the valve actuator rod 50 and urges it inward to actuate the flush/fill valve 21 in response to the depression of the actuator button 13 seen in FIG. 1. The most important difference between the ratcheted rod 56" in FIG. 6 from its counterpart in FIG. 3 is that the steps or rings now increase in diameter in the direction of the actuator button, rather than in the direction of the flush/fill valve 21 as in FIG. 3. If the actuator button 13 is depressed to its inward limit the integral latch button 72" will engage the largest annular ring on the ratcheted portion 59" of the actuator rod 56". When the actuator button 13 is released in part, or in whole, the ratcheted section 56" will be moved backward by the force from the return spring 53 and the latch button 72" will be allowed to move inward to engage a smaller ring in the ratcheted section 56". The object of this construction is to lock the actuator button 13 in its extended position rather than in its depressed position.

A spring 131 has been included in the actuator linkage to protect it from impacts delivered to the actuator button 13 when it is locked in its extended position. The spring 131 is stiff enough to transmit forces for actuating the flush/fill valve 21 when the ratcheted section 59" is not engaged by the latch button 72". The spring 131 will yield, however, to heavy impacts on the button 13, when the latch button 72" has engaged the ratcheted section 59".

To mount the spring 131 in the actuator linkage a cylindrical spring retainer 132 is received in the open end of the actuator sleeve 55 and forms an annular shoulder 133 for abutting the end of that sleeve 55. The retainer 132 has an annular seat 134 on its inwardly facing end to locate one end of the spring 131. An elongated screw 135 slides through a bore in the spring retainer 132 and extends axially through the coils of the spring 131 to a far end that is threadingly received in the rear end of the ratcheted actuator rod 56". This rod 56" also forms an annular seat 136 for the inner end of the spring 131. In passing through the coils of the spring 131 the screw 135 is threaded through a cylindrical spring guide 137 which prevents longitudinal bending of the spring 131.

The descriptions of the four embodiments illustrate that the invention is capable of many embodiments, and therefore, to fairly define the scope of the invention, the following claims are made.

We claim:

1. A pneumatically responsive flood preventer mechanism for insertion between a valve in a supply line to a receptacle and a reciprocating actuator for the valve, to prevent repeated actuation of the valve which would cause overfilling and flooding of the receptacle, the mechanism comprising:

vacuum generating means in the supply line with a low pressure port for drawing a partial vacuum as fluid flows through said means into the receptacle;

a level sensor having an orifice communicating with the receptacle above a normal fluid level, the orifice allowing relief of any partial vacuum communicated to the level sensor when fluid in the receptacle is below the orifice, and the orifice becoming partially sealed when covered by fluid from the receptacle;

lockout means adapted to be positioned between the valve and the actuator to prevent operation of the valve when fluid in the receptacle rises to the level of the orifice, the lockout means being responsive to a partial vacuum to disable operation of the valve by the actuator; and means for pneumatically interconnecting the lockout means, the low pressure port and the level sensor, so that a partial vacuum will be drawn to operate the lockout means only when fluid is flowing through the vacuum generating means and only when fluid has reached the level of the orifice.

2. The flood preventer mechanism of claim 1, wherein the vacuum generating means is formed as a venturi.

3. The flood preventer mechanism of claim 1, wherein the lockout means comprises:

a moveable member adapted for disposition between the actuator and the valve, the moveable member carrying a catch that is moved when the actuator is moved forward to operate the valve; and a latching member supported proximate the moveable member and urged towards a position to engage the catch when a partial vacuum is drawn to operate the lockout means, the latching member then restricting the movement of the moveable member and preventing another cycle of valve operation.

4. The flood preventer mechanism of claim 3, wherein the catch carried by the moveable member is part of a ratcheted section in which a plurality of catches are formed for engagement by the latching member at a plurality of corresponding positions of the valve actuator.

5. The flood preventer mechanism of claim 3, wherein the lockout means further comprises:

a reset shaft extending from outside the lockout means and operatively coupled to the latch for movement therewith in response to a partial vacuum that is drawn to operate the lockout means;

wherein the lockout means forms a vacuum chamber in which a partial vacuum is drawn to move the reset shaft and latch; and wherein the lockout means further comprises relief means in communication with the vacuum chamber to relieve the partial vacuum and permit withdrawal of the reset shaft and latch to a position where the catch is disengaged and the valve is reset for another cycle of operation.

6. The flood preventer mechanism of claim 1, wherein the lockout means comprises:

a sleeve for operable engagement by the actuator and movement therewith, the sleeve having an elongated bore opening towards the valve;

a moveable member having one end for operable engagement with the valve, having an opposite end received in the bore of the sleeve, and having a recess projecting inwardly from an outer surface;

a pin extending radially inward through the sleeve and into the recess in the moveable member to operably couple the sleeve and actuator, the pin having a back end; and a piston slidably mounted to reciprocate across the back end of the pin in response to the drawing of a partial vacuum to operate the lockout means, the piston having a groove for receiving the pin and allowing the pin to move to a position uncoupling the moveable member and the sleeve, thereby operably uncoupling the actuator from the valve.

7. The flood preventer of claim 6, wherein the piston has a slot extending from its pin receiving groove to its opposite side to receive an external implement for urging the pin back to its position coupling the sleeve and the moveable member.

8. The flood preventer of claim 1, wherein the lockout means comprises:

a stepped member insertable between the actuator and the control valve, the stepped member being reduced in cross section to form a shoulder; and a pneumatically responsive plunger mounted for movement between a reset position, and a forward position in which one end of the plunger blocks the forward movement of the shoulder to prevent actuation of the valve.

9. The flood preventer of claim 8, wherein the lockout means forms a vacuum chamber in which a partial vacuum is drawn to move the plunger, and wherein the lockout means further comprises relief means in communication with the vacuum chamber to relieve the partial vacuum and permit withdrawal of the plunger and unblocking of the stepped member.

10. A pneumatically responsive flood preventer mechanism for operation with a valve in a supply line to a receptacle and a reciprocating actuator for the valve, to prevent repeated actuation of the valve which would cause overfilling and flooding of the receptacle, the mechanism comprising:

vacuum generating means in the supply line with a low pressure port for drawing a partial vacuum as fluid flows through said means into the receptacle;

a level sensor having an orifice communicating with the receptacle above a normal fluid level, the orifice allowing relief of any partial vacuum communicated to the level sensor when fluid in the receptacle is below the orifice, and the orifice becoming partially sealed when covered by fluid from the receptacle;

lockout means coupling the operation of the valve to the operation of the actuator, and preventing operation of the valve in response to operation of the actuator when fluid in the receptacle rises to the level of the orifice, the lockout means being responsive to a partial vacuum to disable operation of the valve by the actuator; and means for pneumatically interconnecting the lockout means, the low pressure port and the level sensor, so that a partial vacuum will be drawn to operate the lockout means only when fluid is flowing through the vacuum generating means and only when fluid has reached the level of the orifice.

11. The flood preventer mechanism of claim 10, wherein the vacuum generating means is formed as a venturi.

12. The flood preventer mechanism of claim 10, wherein the lockout means comprises:

a moveable member adapted for disposition between the actuator and the valve, the moveable member carrying a catch that is moved when the actuator is moved forward to operate the valve; and a latching member supported proximate the moveable member and urged towards a position to engage the catch when a partial vacuum is drawn to operate the lockout means, the latching member then restricting the movement of the moveable member and preventing another cycle of valve operation.

13. The flood preventer mechanism of claim 12, wherein the catch carried by the moveable member is part of a ratcheted section in which a plurality of catches are formed for engagement by the latching member at a plurality of corresponding positions of the valve actuator.

14. The flood preventer mechanism of claim 12, wherein the lockout means further comprises:

a reset shaft extending from outside the lockout means and operatively coupled to the latch for movement therewith in response to a partial vacuum that is drawn to operate the lockout means;

wherein the lockout means forms a vacuum chamber in which a partial vacuum is drawn to move the reset shaft and latch; and wherein the lockout means further comprises relief means in communication with the vacuum chamber to relieve the partial vacuum and permit withdrawal of the reset shaft and latch to a position where the catch is disengaged and the valve is reset for another cycle of operation.

15. The flood preventer mechanism of claim 10, wherein the lockout means comprises;

a sleeve for operable engagement by the actuator and movement therewith, the sleeve having an elongated bore opening towards the valve;

a moveable member having one end for operable engagement with the valve, having an opposite end received in the bore of the sleeve, and having a recess projecting inwardly from an outer surface;

a pin extending radially inward through the sleeve and into the recess in the moveable member to operably couple the sleeve and actuator, the pin having a back end; and a piston slidably mounted to reciprocate across the back end of the pin in response to the drawing of a partial vacuum to operate the lockout means, the piston having a groove for receiving the pin and allowing the pin to move to a position uncoupling the moveable member and the sleeve, thereby operably uncoupling the actuator from the valve.

16. The flood preventer of claim 15, wherein the piston has a slot extending from its pin receiving groove to its opposite side to receive an external implement for urging the pin back to its position coupling the sleeve and the moveable member.

17. The flood preventer of claim 10, wherein the lockout means comprises:

a stepped member insertable between the actuator and the control valve, the stepped member being reduced in cross section to form a shoulder; and a pneumatically responsive plunger mounted for movement between a reset position, and a forward position in which one end of the plunger blocks the forward movement of the shoulder to prevent actuation of the valve.

18. The flood preventer of claim 17, wherein the lockout means forms a vacuum chamber in which a partial vacuum is drawn to move the plunger, and wherein the lockout means further comprises relief means in communication with the vacuum chamber to relieve the partial vacuum and permit withdrawal of the plunger and unblocking of the stepped member.

* * * * *